| United States Patent [19] | [11] Patent Number: 4,968,751 |
|---|---|
| Miles et al. | [45] Date of Patent: Nov. 6, 1990 |

[54] ACRYLIC/SILICONE RESINS FOR POWDER COATINGS

[75] Inventors: David E. Miles, Port Huron, Mich.; John C. Reising, Avon, Ohio

[73] Assignee: The Glidden Company, Cleveland, Ohio

[21] Appl. No.: 325,869

[22] Filed: Mar. 20, 1989

[51] Int. Cl.⁵ .............................................. C08F 8/00
[52] U.S. Cl. .................................. 525/100; 524/355; 524/431; 528/26
[58] Field of Search ......................... 525/100; 528/26; 524/355, 431

[56] References Cited

U.S. PATENT DOCUMENTS

| 3,912,670 | 10/1975 | Huemmer et al. | 525/100 |
| 4,107,148 | 8/1978 | Fujiyoshi et al. | 525/440 |
| 4,446,259 | 5/1984 | Vasta | 523/408 |
| 4,472,484 | 9/1984 | Vasta | 428/421 |

OTHER PUBLICATIONS

Hackh's Chemical Dictionary (1972), pp. 37 and 515.

*Primary Examiner*—Melvyn I. Marquis
*Attorney, Agent, or Firm*—Thomas M. Schmitz

[57] ABSTRACT

Powder paint compositions are based on a polymeric binder comprising hydroxyl functional acrylic polymer and cyclic silicone resin adapted to coreact upon heating in the presence of at least 0.1% phosphonium salt catalyst.

8 Claims, No Drawings

ACRYLIC/SILICONE RESINS FOR POWDER COATINGS

This invention pertains to blends of a hydroxyl functional acrylic polymer and solid cyclic silicone resin adapted to coreact in the presence of a phosphonium salt to provide a thermosetting binder for powder paint coatings.

Acrylic resins useful in powder coatings are known to exhibit good weathering properties if the acrylic copolymer does not contain major amounts of copolymerized styrene. U.S. Pat. No. 4,446,259 and U.S. Pat. No. 4,472,484 disclose blends of acrylic binder and silicone resin. Acrylic copolymers of silicone resin should provide considerably improved weathering properties and should offset other film property deficiencies of silicone resins. However, attempting to coreact acrylic copolymer with silicone resins is difficult to achieve in practice since the reaction is difficult to control and often results in useless crosslinked polymers known as gels. The reaction is difficult to control due to hydroxyl groups on the acrylic polymer as well as the hydroxyl groups on the silicone polymer. For instance, a hydroxylated acrylic copolymer prepared in solvent and subsequently reacted with hydroxyl or alkyl ether groups in silicone resin either gelled upon coreaction or gelled during the process of stripping solvent off the resulting product.

It now has been found that a hydroxyl functional acrylic polymer in solid form can be blended with a cyclic solid silicone resin in solid form where silicone molecule includes hydroxyl or methylol groups adapted to become coreactive and crosslink with the hydroxyl acrylic polymer in the presence of a phosphonium salt catalyst to provide a useful thermosetting polymeric binder for powder coatings. The dry solid acrylic polymer and silicone resin can be blended together along with the catalyst, plus opacifying, coloring and filler pigments if desired, and other additives to form a dry premix which can be extruded into pellets and subsequently ground into fine powder paint. Conventional urethane crosslinkers which can cause a deleterious effect on exterior powder paint films can be avoided and eliminated by using the functional solid silicone resin as a crosslinker in accordance with this invention. The hydroxyl acrylic polymer is crosslinked with the functional silicone resin in the heating step after the powder paint is applied to the substrate to incorporate the cyclic silicone resin into a highly structured crosslinked polymeric paint film. Coreacting the acrylic polymer with the silicone resin in crosslinked structure during the heat curing step provides a substantial improvement over a physical blend of the polymers and further overcomes the undesirable gelling problem encountered by attempting to coreact the respective reactants in a preformed polymer prior to forming a powder paint. In the heat curing step, the powder paint is heated at elevated temperatures to obtain proper flow-out of the powder paint as well as activated crosslinking between the functional acrylic polymer and the functional silicone resin. Powder paints formulated in accordance with this invention, provide low and variable gloss durable paint films exhibiting superior exterior weathering and substantially improved chalk resistance. These and other advantages will become more apparent by referring to the detailed description and illustrative examples.

SUMMARY OF THE INVENTION

Briefly, the invention pertains to powder coatings containing a polymeric binder combination comprising by weight between 50% and 80% hydroxyl functional acrylic polymer and between 20% and 50% of a solid cyclic silicone resin where the mixture is adapted to coreact upon curing in the presence of at least 0.1% phosphonium salt catalyst. Dry powders of both the acrylic polymer and the silicone resin are blended uniformly together with other powder paint additives, including filler and colorant pigments if desired, and preferably simultaneously extruded under heat and pressure to form powder paint particles useful as a powder paint coating on exterior substrates. The powder paint is heat cured to produce a crosslinked thermoset coating.

DETAILED DESCRIPTION OF THE INVENTION

The invention pertains to a polymeric binder for powder paint coatings where the binder comprises a dry blend of hydroxyl functional acrylic polymer and solid cyclic silicone resin adapted to be coreactive in the presence of a phosphonium salt catalyst upon heat curing.

Referring first to the hydroxyl functional acrylic polymer, the acrylic polymer is produced in non-aqueous polymerization such as by organic solvent or bulk copolymerization of ethylenically unsaturated monomers including acrylic and hydroxyl functional monomers. Ethylenic monomers contain carbon-to-carbon unsaturation and include vinyl monomers, acrylic monomers, allylic monomers, acrylamide monomers, and mono-and dicarboxylic unsaturated acids. Vinyl monomers include vinyl ester, vinyl acetate, vinyl propionate, vinyl butyrates, vinyl benzoates, vinyl isopropyl acetates and similar vinyl esters; vinyl halides such as vinyl chloride, vinyl fluoride, and vinylidene chloride; vinyl aromatic hydrocarbons such as styrene, methyl styrenes and similar lower alkyl styrenes, chlorostyrene, vinyl toluene, vinyl naphthalenes, divinyl benzoate, and cyclohexene; vinyl aliphatic hydrocarbon monomers such as alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene; and vinyl alkyl ethers such as methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylate, as well as amino acrylates and methacrylates. Acrylic acids include acrylic and methacrylic acid, ethacrylic acid, alphachloroacrylic acid, alpha-cycanoacrylic acid, crotonic acid, and beta-acryloxy propionic acid. Other useful ethylenic monomers can include N-alkylol amides such as acrylamides or methacrylamides including N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups. Hydroxyl functional monomers include hydroxy alkyl acrylates such as 2-hydroxy ethyl acrylate and methacrylate, 2-hydroxy propyl acrylate and methacrylate, and similar lower alkyl 2-hydroxy acrylates.

In accordance with this invention, the hydroxyl functional acrylic polymers comprise copolymerized monomers on a weight basis between 50% and 80% acrylic monomer, between 5% and 15% hydroxyl functional monomer, with the balance being other ethylenically unsaturated monomer. The hydroxy acrylic polymers are solid resins at ambient temperature with a Tg above about 40° C., typically above about 55° C., and tack temperature above about 77° C., preferably between 82° C. and 88° C., and typically about 85° C. The molecular number average weight as measured by GPC is between 2,000 and 12,000 and preferably between 3,000 and 7,000 as measured according to ASTM D 3016-78, or ASTM 3536-76, or ASTM 3593-80. The hydroxyl number should be between 20 and 50.

The hydroxyl functional acrylic polymers can be produced in a fusion or solvent polymerization process of the ethylenic monomers where the solvent if any is subsequently stripped from the finished polymer. Generally, the polymerization is conducted at a temperature of about 20°-100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide, azo compounds such as azodiisobutyronitrile and dimethylazodiisobutyrate; and the like. The amount of initiator typically is between about 0.1 and 3% based on the weight of the copolymerized monomer.

Referring now to the silicone resins useful in this invention, the silicone resins are solid, non-liquid silicone resins at ambient temperature and are primarily based on cyclic silane molecules. Silicone resins are based on a chemical backbone structure comprising alternative silicon and oxygen atoms, where methyl groups primarily or other lower alkyl groups or phenyl groups are attached to the silicon atoms, provided that hydroxyl groups or lower alkyl ether (methoxy or alkoxy groups) are available and attached to silicon atoms for curing purposes. Silicone resins are prepared from organochlorosilanes such as methyltrichlorosilane, phenyltrichlorosilane, and dimethyldichlorosilane, which can be coreacted with an organic halide such as methyl chloride or chlorobenzene in the presence of silicon and copper catalyst to produce chlorosilanes which can be further reacted with water to form hydroxysilanes and dehydrolysis to eventually organopolysiloxanes (silicones). In accordance with this invention, useful silicones comprise cyclic organopolysiloxanes being solids resin at ambient temperatures and having a Tg above about 40° C. and a tack temperature above about 77° C.

Useful cyclic silicones are hydroxy functional cyclic silicones with two or more hydroxyl groups per cyclic silicone molecule unit where the silicone resin has a number average molecular weight between 2,500 and 3,500. Molecular weights can be determined by gel permeation chromatography (GPC). Preferred cyclic siloxane is a cyclic silanol having at least two SiOH groups per molecule and where some of the non-hydroxy valence bonds of the silanol contribute to the cyclic structure. Preferred cyclic silicone resins include those disclosed in U.S. Pat. No. 3,912,670 and U.S. Pat. No. 4,107,148, and both said patents are incorporated herein by reference. The most preferred hydroxy functional silicone resin comprises a hydroxy functional low molecular weight cyclic silicone intermediate (Z-6018, Dow Corning) having a number average molecular weight of about 600 and the theoretical formula:

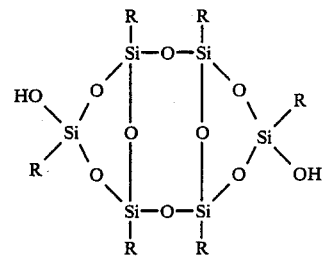

where R is independently a lower alkyl or phenyl group and particularly methyl, ethyl, or phenyl groups. Physical properties of Z-6018 are as follows:

| Appearance | Flaked solid |
| --- | --- |
| Theoretical Silicone Content, wt. percent | 96.6 |
| Nonvolatile Content, percent | 98.0 |
| Volatility, 1.5 gms for 3 hrs. at 482 F. (250° C.), percent | 4.5 |
| Hydroxyl Content | |
| weight percent | 6.4 |
| hydroxy no. | 211 |
| weight percent free | 0.5 |
| Specific Gravity at 77° F. (25° C.) | 1.23 |
| Durran Melting Point, degrees | 185 F. (85° C.) |

The desired crystallinity, tack temperatures and flow properties are derived from a rigid diacid, a multifunctional glycol and hydroxy-functional cyclic siloxanes. The preferred siloxane is Z-6018 and self-condensation products thereof. Such condensation products may contain up to twelve units of the above-identified siloxane molecule and have molecular weights of from about 2,500 to about 3,500 and have the following oligomeric structures of repeating units of cyclic siloxane:

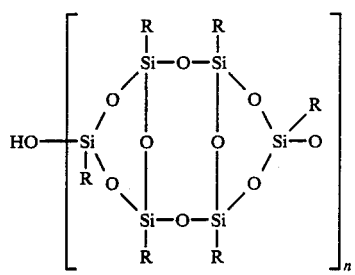

where n is between 1 and 12 and the oligomer can have a number average weight between 600 and 8000 provided the resulting silicone resin has a Tg or softening point above 40° C. and a tack temperature above 77° C.

Referring next to the phosphonium salt catalyst useful for activating coreaction between the hydroxyl functional acrylic polymer and the functional cyclic silicone, the phosphonium salt comprises an organic salt containing a phosphonium ion $PH_4$ or substituted variations thereof to provide an activated PH ion where the substituted can include ammonium, and substituted ammonium nucleophilic ions. Examples of phosphonium salts useful as catalysts in accordance with this invention include ethyl triphenyl phosphonium acid acetate, benzyl trimethyl ammonium acid acetate. The level of phosphonium salt catalyst used in accordance with this invention is preferably above 0.1% and between 0.1% and 3%, preferably 0.5% to 1.5%, based on the weight of the hydroxyl acrylic polymer and functional cyclic silicone resin. As catalyst level increases, cure related film integrity properties increase such as MEK resistance, hardness, gloss retention, and chalk resistance.

Solid particles of hydroxyl functional acrylic polymer and the cyclic silicone resin can be dry blended together on a weight basis comprising between 50% and 80% hydroxyl acrylic resin and between 20% and 50% cyclic silicone resin to provide the organic polymeric binder component of the powder paint of this invention. The binder blend or individual dry components thereof can be thoroughly and uniformly mixed with raw batch ingredients by homogenizing the binder, pigmentary solids, plasticizers and other components to uniformly blend the resinous binder with the pigmentary solids. Pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, phthalocyanine green, phthalonirile blue, ultramarine blue, cadmium pigments, chromium pigments, and the like. Filler pigments such as clay, silica, talc, mica, woolastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder. The extrudate emerges from the extruder as a ribbon of less than about 1/16 inch thickness which passes into a water cooled stainless steel conveyor belt whereby the plastic ribbon extrudate fully hardens. The cooled extrudate then passes through a mechanical commuter discharged at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

The powder paints in accordance with this invention can be applied to a steel panel substrte and moderately heated between temperatures above about 80° C. and 100° C. to obtain desirable flow out. Cure and crosslinking between the hydroxyl acrylic polymer and the functional cyclic silicone resin is achieved by heating for time and temperature sufficient to obtain a full cure. For example, heating for 20 minutes more or less at temperatures of about 190° C. typically provided a good cure. Although not intended to be bound by theory, it is believed that the phosphonium salt catalyst activates the respective hydroxyl functional groups on both the acrylic and silicone components to coreact into a crosslinked ether group (—C—O—Si—) between the respective crosslinking components.

The merits of this invention are further illustrated by the following illustrative examples where percentages are weight percent and temperatures are ° C., unless otherwise indicated.

EXAMPLE 1

(a) Acrylic

A hydroxyl functional acrylic copolymer was produced by solvent copolymerization of the following monomers.

| Monomer | Wt. parts |
|---|---|
| Styrene | 20.5 |
| Methyl methacrylate | 44 |
| Butyl acrylate | 25 |
| 2-hydroxy ethyl methacrylate | 8.5 |
| Acrylic acid | 2 |

The acrylic polymer has a number average molecular weight of 5,000, a hydroxyl number of 42, a hydroxyl content of 1.1% and an acid number of 16.

(b) Powder Paint

Powder paint was produced from the following materials by the indicated process. The silicone resin was (describe)

| Materials | Wt. parts |
|---|---|
| Acrylic resin (Ex. 1 a) | 48.8 |
| Silicone resin | 12.2 |
| Catalyst (ethyl triphenyl phosphonium acid acetate) | 1.0 |
| Flow agent | 0.6 |
| Benzoin | 0.3 |
| Titanium Dioxide | 37.1 |
| | 100.0 |

The powder paint was produced by dry blending the indicated materials together followed by melt mixing and extruding the blend into pellets and followed by grinding to powder having an average particle size of 30–40 microns. Powder paint was applied to a metal substrate and heat cured at 380° F. for 20 minutes.

The cured film was tested and compared to a powder paint containing the same acrylic polymer crosslinked with a blocked isophorone diisocyanate. After 140 hours Dew Cycle W-O-M (ASTM G23-AH) the comparative result were as follows:

| | Acrylic/Silicone | Acrylic/Urethane |
|---|---|---|
| Initial gloss | 85 | 85 |
| 140 hr. gloss | 25 | 5 |
| chalking | None | Severe |

EXAMPLE 2

The powder paint formula in Example 1 was repeated except that the phosphonium catalyst was varied between 0.12% and 1.0% based on the total formula of 100 weight parts shown in Example 1.

| % Catalyst | MEK rubs | Pencil Hardness |
|---|---|---|
| 0.12% | 15 | F |
| 0.24% | 25 | F |

-continued

| % Catalyst | MEK rubs | Pencil Hardness |
|---|---|---|
| 0.48% | 40 | F |
| 1.0% | 100 | H |

EXAMPLE 3

Weatherometer and QUV accelerated exposure tests were performed on powder paint compounded similarly to Example 1 applied to metal substrates and heat cured at 193° C. for 20 minutes. The cyclic silicone crosslinked film was compared to a diisocyanate crosslinked film.

| Materials | Wt. Parts (silicone x-linked) | Wt. Parts (diisocyanate x-linked) |
|---|---|---|
| Acrylic (Ex. 1) | 49 | 49 |
| Silicone (Dow Corning Z6018) | 12 | 0 |
| Isophorone diisocyanate curing agent (IPDI) | 0 | 12 |
| TiO2 white pigment | 37 | 37 |
| Benzoin Outgas agent | 0.6 | 0.6 |
| Resiflow agent | 0.4 | 0.4 |
| Catalyst (ethyl triphenyl phosphonium acid acetate) | 0.1 | 0 |

The following are weatherometer and QUV accelaterated exposure test data on the foregoing two formulas:

| | (ASTM G23) Weatherometer | | (ASTM D4329) QUV | | (ASTM G7) 450 south Florida Subtropical | |
|---|---|---|---|---|---|---|
| Pigmentation | white | Brown | White | Brown | White | brown |
| Hour exposed | 1500 | 1000 | 1500 | 600 | 2 yrs. | 2 yrs. |
| Gloss retain at 60° | | | | | | |
| Acrylic/IPDI | 19% | 45% | 35% | 45% | 66 | 69 |
| Acrylic/Z6018 | 62% | 62% | 70% | 44% | 90 | 79 |

The scope of this invention is not intended to be limited except by the appended claims.

We claim:

1. A thermosetting powder paint composition containing a coreactive polymeric binder comprising by weight between 50% and 80% hydroxyl functional acrylic polymer of non-aqueous polymerized ethylenically unsaturated monomers, and between 20% and 50% of a cyclic solid silicone resin having two or more hydroxy or methoxy groups per molecule, where the polymeric binder contains between 0.1% and 3% phosphonium salt catalyst to activate coreaction between said hydroxyl functional acrylic polymer and said silicone resin upon heating, where the acrylic polymer and the silicone resin have a Tg above about 40° C., where said phosphonium salt provides an activated pH ion.

2. The composition in claim 1 where the acrylic polymer comprises by weight between 50% and 80% acrylic monomer, between 5% and 15% hydroxyl functional monomer, with the balance being other ethylenically unsaturated monomers.

3. The powder paint composition in claim 1 where the acrylic polymer has a Tg above about 40° C.

4. The powder paint composition in claim 1 where the number average molecular weight is between about 2,000 and 12,000 as measured by GPC.

5. The powder paint composition in claim 1 where the cyclic solid silicone resin has a Tg above about 40° C.

6. The powder paint composition in claim 1 where the solid silicone resin contains two or more hydroxyl groups per silicone molecule and has a number average molecular weight between about 2,500 and 3,500.

7. The composition in claim 1 where the phosphonium salt catalyst comprises ethyl triphenyl phosphonium acid acetate.

8. The composition in claim 1 where the level of phosphonium catalyst is between 0.5% and 1.5%.

* * * * *